United States Patent
Shiao

(10) Patent No.: US 11,793,200 B2
(45) Date of Patent: Oct. 24, 2023

(54) HYPOCHLOROUS ACID DISINFECTANT AND ITS PRODUCTION METHOD

(71) Applicants: Wen Chung Shiao, Taipei (TW); SUPER AQUA INTERNATIONAL CO., LTD., Taipei (TW)

(72) Inventor: Wen Chung Shiao, Taipei (TW)

(73) Assignees: Wen Chung Shiao, Taipei (TW); SUPER AQUA INTERNATIONAL CO., LTD., Taipei (TW)

(*) Notice: Subject to any disclaimer, the term of this patent is extended or adjusted under 35 U.S.C. 154(b) by 598 days.

(21) Appl. No.: 16/997,316

(22) Filed: Aug. 19, 2020

(65) Prior Publication Data
US 2021/0120823 A1  Apr. 29, 2021

(30) Foreign Application Priority Data
Oct. 29, 2019  (TW) ............................ 108139088

(51) Int. Cl.
*A01N 59/00*  (2006.01)
*C01B 11/04*  (2006.01)

(52) U.S. Cl.
CPC .............. *A01N 59/00* (2013.01); *C01B 11/04* (2013.01)

(58) Field of Classification Search
None
See application file for complete search history.

(56) References Cited

U.S. PATENT DOCUMENTS

| 5,711,211 A | 1/1998 | Ide et al. |
| 7,758,807 B2 * | 7/2010 | Smith ............... A01N 59/00 424/53 |
| 11,638,429 B2 * | 5/2023 | Shiao ............... A01N 43/64 424/661 |

(Continued)

FOREIGN PATENT DOCUMENTS

| CN | 101124169 A | 2/2008 |
| CN | 101233851 A | 8/2008 |

(Continued)

OTHER PUBLICATIONS

Norihito et al., "Technology of Water Purification", Japan Gakuindo, 1985, p. 102.

(Continued)

*Primary Examiner* — John J Figueroa
(74) *Attorney, Agent, or Firm* — Muncy, Geissler, Olds & Lowe, P.C.

(57) ABSTRACT

A hypochlorous acid disinfectant and its production method. The disinfectant is prepared by weight in a total of 100% as chlorine powder (chlorine compounds including sodium hypochlorite or calcium hypochlorite) of 20 to 45%, adding sodium dihydrogen phosphate or citric acid, or ingredients or raw materials with acidic pH of 15 to 40% as a main ingredient, a desiccant of 15 to 20%, excipients of 3 to 8%. The method includes: stirring the chlorine powder with the desiccant; adding the sodium dihydrogen phosphate, the citric acid, or the ingredients or raw materials with acidic pH in order; and adding the excipient while stirring for 20 to 30 minutes until completely uniform to prepare the hypochlorous acid (powder) disinfectant. According to the method, a hypochlorous acid tablet disinfectant can be prepared.

8 Claims, 4 Drawing Sheets

(56) References Cited

U.S. PATENT DOCUMENTS

| | | | | |
|---|---|---|---|---|
| 2007/0134127 A1* | 6/2007 | Smith | ................... | C01B 11/068 |
| | | | | 422/305 |
| 2009/0148342 A1* | 6/2009 | Bromberg | ................ | C11D 3/48 |
| | | | | 424/661 |
| 2014/0272039 A1 | 9/2014 | McKedy | | |
| 2015/0044144 A1* | 2/2015 | Lin | ....................... | A01N 59/00 |
| | | | | 424/10.3 |

FOREIGN PATENT DOCUMENTS

| | | | |
|---|---|---|---|
| JP | 3-258392 A | 11/1991 | |
| JP | 5-237478 A | 9/1993 | |
| JP | 2627101 B2 | 7/1997 | |
| JP | 3085356 U | 4/2002 | |
| JP | 2005-161142 A | 6/2005 | |
| JP | 2005-349382 A | 12/2005 | |
| KR | 10-2018-0073897 A | 7/2018 | |
| WO | WO 00/51434 A1 | 9/2000 | |
| WO | WO 03/013250 A1 | 2/2003 | |

OTHER PUBLICATIONS

Norihito et al., "Technology of Water Purification", Japan Gakuindo, 1985, p. 104.

Reply dated Oct. 27, 2021 in response to Rule 70a (1) EPC and extended European Search Report from European Application No. EP20204497.0.

Extended European Search Report for European Application No. 20204497.0, dated Mar. 24, 2021.

Indian Office Action for Indian Application No. 202014040103, dated Jul. 7, 2021, with English translation.

* cited by examiner

HYPOCHLOROUS ACID DISINFECTANT AND ITS PRODUCTION METHOD

This application claims priority for Taiwan (R.O.C.) patent application no. 108139088 filed on 29 Oct. 2019, the content of which is incorporated by reference in its entirely.

BACKGROUND OF THE INVENTION

Field of the Invention

The invention relates to a related field of a disinfectant, more particularly related to a hypochlorous acid disinfectant, which can be made into a hypochlorous acid disinfectant, a hypochlorous acid tablet disinfectant, and its production.

Description of the Prior Art

Chlorine-containing disinfectants such as sodium hypochlorite and calcium hypochlorite have been used for disinfection and sterilization for more than 100 years. Because it is easy to obtain for production, low in price, easy to use and has an accurate sterilization effect, it is the most commonly used sterilant in the current disinfection drug market, which is not only economical, but also can kill more than 90% of bacteria in a few minutes at normal temperature and neutral pH, and it is well known as the best sterilant. The mechanism of its bactericidal action is the formation of hypochlorous acid in water, which can interact with the cell wall of bacteria, and invade the cells and oxidize with proteins or destroy the cell walls due to small molecule and being uncharged, thereby causing metabolic disorders and bacterial death. However, many studies have shown that the use of chlorine-based drugs in water is prone to produce chloroform, chlorine compounds and the like with organic substances, and hence has the problem of carcinogenesis, liver poisoning and kidney poisoning.

Further, chlorine-containing disinfectants have many disadvantages, such as corrosive to human skin mucous, unfriendly environment, and easy to rust the equipment; in addition, having strong and insufferable irritating smell at high concentrations. It is reported that chlorine- and bromine-containing preparations have caused environmental pollution, which has attracted more and more attention Therefore, finding a disinfectant with good sterilizing properties without chemical residues has become a concern of government sectors and scientists.

For the percentage relationship between hypochlorous acid and pH value, please refer to FIG. 1, "Technology of Water Purification", co-authored by Tanbo Norihito and Ogasawara Hongichi, published by the Japan Gakuindo (1985). For the percentage of hypochlorous acid and pH value, please refer to the following instructions.

It is known to the public that in order to produce hypochlorous acid components, in Japan table salt (sodium chloride) is added to water, and electrolysis is performed through a diaphragm to generate; in anodic acid-forming water, a hypochlorous acid component (hypochlorous acid of 10-50 ppm with pH 2.5) is found; although hypochlorous acid is low concentration, it has a strong bactericidal effect and is known as a magic water. (Referring to Japan publication of patent application No. H03~258392).

Thereafter, some Japanese companies used hydrochloric acid and water for electrolysis to produce slightly acidic hypochlorous water (hypochlorous acid of 10 to 30 ppm with pH 5 to 6.5); around 1990, Tatsuo Okazaki of OMC (Okazaki Manufacture Company) Japan used patented electrolytic equipment (Patent Publication 1993 No. 5-237478) to make a patented electrolyte by a fixed proportion of hydrochloric acid and table salt (sodium chloride) (Japan patent application No. 249755) and used non-diaphragm electrolysis to generate hypochlorous acid water which is named "Super Micro-softened Acidified Water" with a pH value of 4 to 7.0 and a concentration of hypochlorous acid of 50 to 80 ppm. After the invention was launched on the market, it was introduced by major Japanese beer and beverage companies, dental clinics of the National Hospital, etc., opening a novel era of the hypochlorous acid application.

In Japan, the hypochlorous acid produced by produced by electrolysis is also known as one kind of functional water. The development of production technologies of hypochlorous acid for the chlorine-containing sterilization agents in Japan is described in following paragraphs.

The first generation of sodium hypochlorite (bleach water), which has a property of high sterilization with a high concentration, is well known as the best sterilant; the hypochlorous acid is stocked at a concentration of 12% or above, and above pH 12. Such hypochlorous acid has advantages of high sterilization (at high concentration), less residues, safety at low concentration, low cost, and wide applications in many industries. However, the hypochlorous acid has some disadvantages, for example, the hypochlorous acid becomes alkaline under high concentration and may hurt skin and mucous, corrode metal, and easily embrittle rubber or plastic; furthermore, it is dangerous that the hypochlorous acid must be manually diluted for use.

The second generation of functional sterilant water is a strong acidic water produced by electrolyzing salt water, and it has good sterilization property but low stabilization; the second generation of functional sterilant water may corrode equipment, degrade into chlorine, and have degraded sterilization effect in the presence of organic compound. Such hypochlorous acid has concentration of 10-50 ppm (0.001-0.005%), and a pH value below 2.7. The second generation of functional sterilant water has advantages of high sterilization at low concentration of hypochlorous acid, good effect for many kinds of bacteria, and less residues, and disadvantages of low stabilization of hypochlorous acid, strong corrosion for metal, degraded sterilization property in the presence of organic compound, and easy degradation into chlorine.

The third generation of Hi-ClO acid water (electrolyzed hypochlorous acid) has pH value in range of 4.0 to 7.0 and contains 100% of hypochlorous acid sterilant water, it has high sterilization property at low concentration with chlorine under 1 ppm. This technology is proposed by Tatsuo Okazaki (refer to Japan patent application No. 249755) based on electrolysis of electrolyte of salt being with hydrochloric acid, in order to produce hypochlorous acid with a concentration of 50~80 ppm (0.005~0.008%) at pH 4.0~7.0.

Thereafter, in 1998, Tatsuo Okazaki again invented a novel technology, in which a mixing machine of sodium hypochlorite and hydrochloric acid solution is used to produce hypochlorous acid sterilizing water with a high concentration of 50 ppm to 200 ppm. This technology eliminates the need to use electrolysis to produce high-concentration hypochlorous acid sterilizing water. Japan O Company also improved the storage structure of the sodium hypochlorite tank and the hydrochloric acid tank used by the above machine to apply for an improved patent. Please refers to Japanese Utility Model Registration No. 3085356 in 2002. In 2005, Japanese HSP company proposed to produce high concentration hypochlorous acid sterilizing water with 50 ppm~200 ppm at pH 4.0~7.0 by mixing sodium hypochlorite solution and diluted acidic liquid by using machine to control quantity, and this technology was filed a patent application (refer to Japan patent publication No. 2005-161142). The technology does not require electrolysis process, but prepare (alkaline) sodium hypochlorite and (acidic) hydrochloric acid liquid (or acidic solution), such that the sodium hypochlorite solution, which contains with the hypochlorous acid (HCLO) and hypochlorous acid group ion (CLO⁻) at alkaline environment, may produce the hypochlorous acid with high stabilization and high concertation at slightly acidic pH of 4~6.5

In 2006, Tatsuo Okazaki et al. reinvented a novel technology, i.e., a machine that uses sodium hypochlorite solution or sodium chlorite solution, and mix with carbonated gas to produce hypochlorous acid sterilizing water. it has a patent registered in Japan and China (Japanese Patent Publication No. 2005~349382, China Publication No. CN101124169A). In this technology, dissolved carbon dioxide gas is used to produce carbonated water with an acidic pH, which is added to an aqueous solution of sodium hypochlorite or an aqueous solution of sodium chlorite to produce the hypochlorous acid sterilizing water having a pH value of 4.0 to 6.5. The claims include adding an acid other than carbonic acid to sodium hypochlorite aqueous solution or sodium chlorite aqueous solution (note: please refer to claim 5 of the said Chinese patent) to generate hypochlorous acid sterilizing water. This technology mixes sodium hypochlorite with basic pH and water with an acidic carbonated gas to generate hypochlorous acid with a stable pH of 4.0 to 6.5, wherein different batches of the sodium hypochlorous solutions are separately mixed with carbonated water to prepare hypochlorous acid at a concentration of 50 ppm, 100 ppm, 200 ppm, or higher concentration (note: adjustable). The hypochlorous acid is slightly acidic with a pH of about 4.0 to 6.5 and has high stability. It can be used in various industries for sterilization, shorten sterilization time, be safe for people, and be friendly to the environment.

After the prior novel technology of hypochlorous acid is developed, the generated hypochlorous acid thereby has a concentration that is higher than the same produced by the electrolytic principle, and has a stronger sterilization. It has been widely used in Japan's major beer, beverage factories, food, restaurants, hotels, or national hospitals, dental clinics, aquaculture, livestock industry, aquatic industry, etc., and has been used in various industries for many years. Uni-President, King Car Group, Kinmen Kaoliang Liquor Inc., 7-11 and McDonald's Large Cut Vegetable Factories in Taiwan have used this technology for many years.

Chlorine compounds are the most commonly used fungicides, the reaction in water is the same as that of liquid chlorine and sodium hypochlorite solution (bleach water); the conversion of chlorine content is expressed as "effective chlorine". and then chlorine (powder) is added to water to produce a chemical reaction, wherein the main dissociation produces hypochlorous acid (HCLO), hypochlorite ion (CLO—) and chloride ion (CL—). The chloride ion is the same as the main component of chloride ion in seawater, which have no sterilization effect. Hypochlorous acid (HCLO) and hypochlorite ion (CLO—) have a sterilization effect and are called "effective free chlorine".

However, hypochlorous acid (HCLO) and hypochlorite ion (CLO—) will vary greatly with changes in pH. Chlorine powder or sodium hypochlorite solution (bleach water) dissolved in water will generate hypochlorous acid (HCLO) and hypochlorite ion (CLO—). Although hypochlorous acid (HCLO) and hypochlorite ion (CLO—) are both effective free chlorines, the sterilization of hypochlorous acid (HCLO) is 80 times greater than that of hypochlorite ion (CLO—). (See FIG. 2, U.S. EPA, partially added, "Water Purification Technology" published in Japan) Since the chlorine powder or sodium hypochlorite solution has a pH that is alkaline after being dissolved in water, some of components are dissociated into the hypochlorous acid group ion (CLO—) with weak sterilization dominates though some of the components are dissociated into the hypochlorous acid (HCLO) with strong sterilization. (See FIG. 1) In order to produce 100% hypochlorous acid with stable and powerful sterilization ingredients, as shown in FIG. 1, hypochlorous acid and hypochlorous acid group ions are 100% and stable hypochlorous acid when the pH is 4~6.5, which is the main theoretical basis of the present invention.

The patent application of this invention is related to product a disinfect. The chlorine powder, which have chlorine compounds including sodium hypochlorite or calcium hypochlorite, is added into water to make a chemical reaction to dissociate the components of the chlorine compounds, so as to produce hypochlorous acid (HCLO) and hypochlorous acid group ion (CLO⁻), which are alkaline in pH. In addition, the calculated proportion of sodium dihydrogen phosphate (inorganic acid) or citric acid (organic acid) or pH acidic components or raw materials is added into water to obtain slightly acidic water with pH value of 4 to 6.5, so that after the chlorine powder (having chlorine compounds including sodium hypochlorite or calcium hypochlorite) is dissolved in slightly acidic water, the hypochlorous acid and the hypochlorous acid group ion, which are alkaline, can produce a stable hypochlorous acid with high concentration in slightly acidic water with pH value of 4 to 6.5. The hypochlorous acid has strong sterilization effects and can conduct quick and powerful sterilization. It is safe for people, and friendly to the environment while being widely used in the disinfection and sterilization of various industries in the future to gradually replace common used chlorine powder or disinfectants such as sodium hypochlorite solution or calcium hypochlorite. The technology of the invention can be more widely used in various industries for disinfection and sterilization, and provide safer, more effective and more environmentally friendly sterilization method, which will benefit national health and environmental welfare.

Hypochlorous acid has been approved as a food addition by Ministry of Health and Welfare of Japan, and also been approved as food contact substances and high level disinfectants by U.S. Food and Drug Administration to sterilize medical equipment for reuse. Furthermore, hypochlorous acid has also been approved as a main disinfect ingredient for washing foods by Ministry of Health and Welfare of Taiwan, and can be used to disinfect medical equipment after the application is approved.

The development of the hypochlorous acid agent and hypochlorous acid tablet agent of this application does not need the traditional use of electrolytic equipment to produce hypochlorous acid, and does not need the mixing equipment for mixing the agent described above to produce hypochlorous acid; further, there is no need to plastic bucket tank to transport sodium hypochlorite solution, and it greatly saves transportation costs or the use of plastic bucket containers. Customers and guests can add tap water or purified water into the product at anytime, anywhere, to produce hypochlorous acid with a concentration of 100 ppm, 200 ppm or higher for necessary disinfection or sterilization of vegetables and fruits, or for removing mildew or odor from the environment, bleaching, cleaning and sterilization of kitchen and bathroom, or for disinfection and demand of various industries.

SUMMARY OF THE INVENTION

Based on the above reasons, the hypochlorous acid disinfectant and its production method of the present invention are a hypochlorous acid agent (powder) and hypochlorous acid tablet disinfectant and its production method, which may effectively solve the inconvenience of using general disinfectants, and the inconvenience that traditionally use electrolytic equipment or machine mixing equipment using chemicals to produce hypochlorous acid sterilizing water.

To achieve the above purpose, this invention presents a hypochlorous acid disinfectant, using a method based on weight percentage, centering on the presence and stability of hypochlorous acid at a pH of 4 to 6.5, to develop a hypochlorous acid product with safety, convenience and high concentration. The present invention is calculated by weight percentage: with a chlorine powder (chlorine compounds including sodium hypochlorite or calcium hypochlorite) of 20 to 45%, adding sodium dihydrogen phosphate or citric acid, or ingredients or raw materials with acidic pH of 15 to 40% as a main ingredient, a desiccant of 15 to 20%, and excipients of 3 to 8%, the total amount is 100%. The production method is to mix the chlorine powder with the desiccant, then add sodium dihydrogen phosphate or citric acid or ingredients, or raw materials with acidic pH in turn, and then add the excipient, and after stirring well for about 20 to 30 minutes, the hypochlorous acid disinfectant in this application case will be made.

Further, the same main ingredients as the above: a chlorine powder (chlorine compounds including sodium hypochlorite or calcium hypochlorite) of 20 to 45%, adding sodium dihydrogen phosphate or citric acid, or ingredients or raw materials with acidic pH of 15 to 40% as a main component, and a desiccant of 15 to 20%, adding sodium bicarbonate of 5% to 10%, and excipients of 5 to 10%, and after well stirring for about 20 to 30 minutes, the mixing agent may be made into tablets by a tableting press to prepare hypochlorous acid tablets of this invention. The tablets may be increased or decreased in raw material and percentage according to the concentration of hypochlorous acid on demand, and the properties of slow or instant dissolution.

The hypochlorous acid agent (powder) and hypochlorous acid tablet disinfectant of the present invention, which is precisely measured and does not require calculation or another proportion, and can directly added to tap water or purified water, so that it is convenient to use and can be wisely used without transportation.

The technical features and advantages of the disclosure have been outlined quite extensively above, so that the detailed description of the disclosure below may be better understood. Other technical features and advantages that constitute the claims of the disclosure will be described below. Those with ordinary knowledge in the technical filed of this disclosure should understand that the concepts and specific embodiments disclosed below can be used quite easily to modify or design other structures or processes to achieve the same purpose as the disclosure. Those with ordinary knowledge in the field of technology to which this disclosure belongs should also understand that such equivalently constructed similar products cannot be separated from the spirit and scope of the present disclosure as defined in the scope of the attached claims.

DESCRIPTION OF THE PREFERRED EMBODIMENTS

Figure 1:
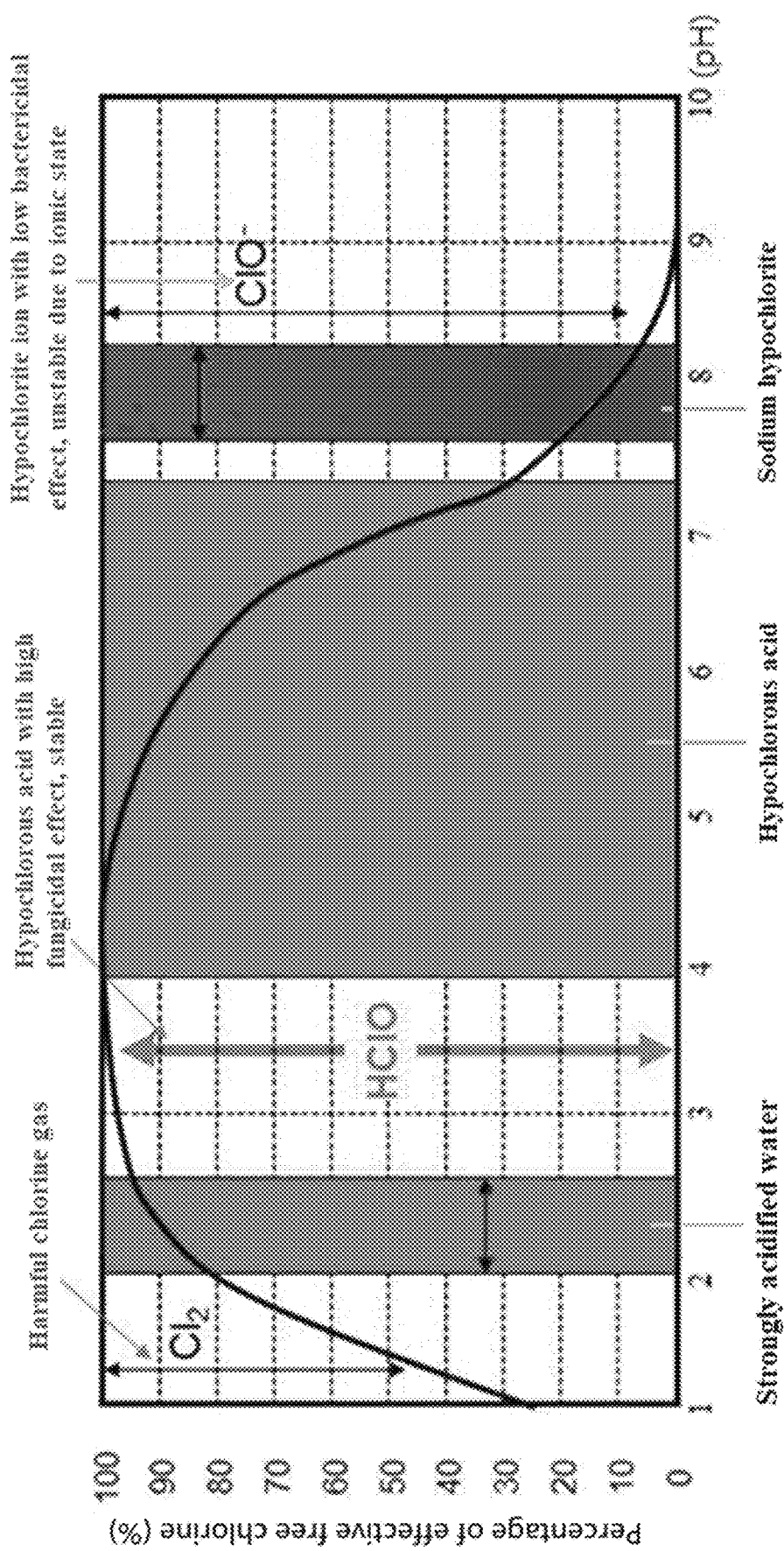
FIG. 1 shows the relationship between the percentage of hypochlorous acid and pH.
Figure 2:
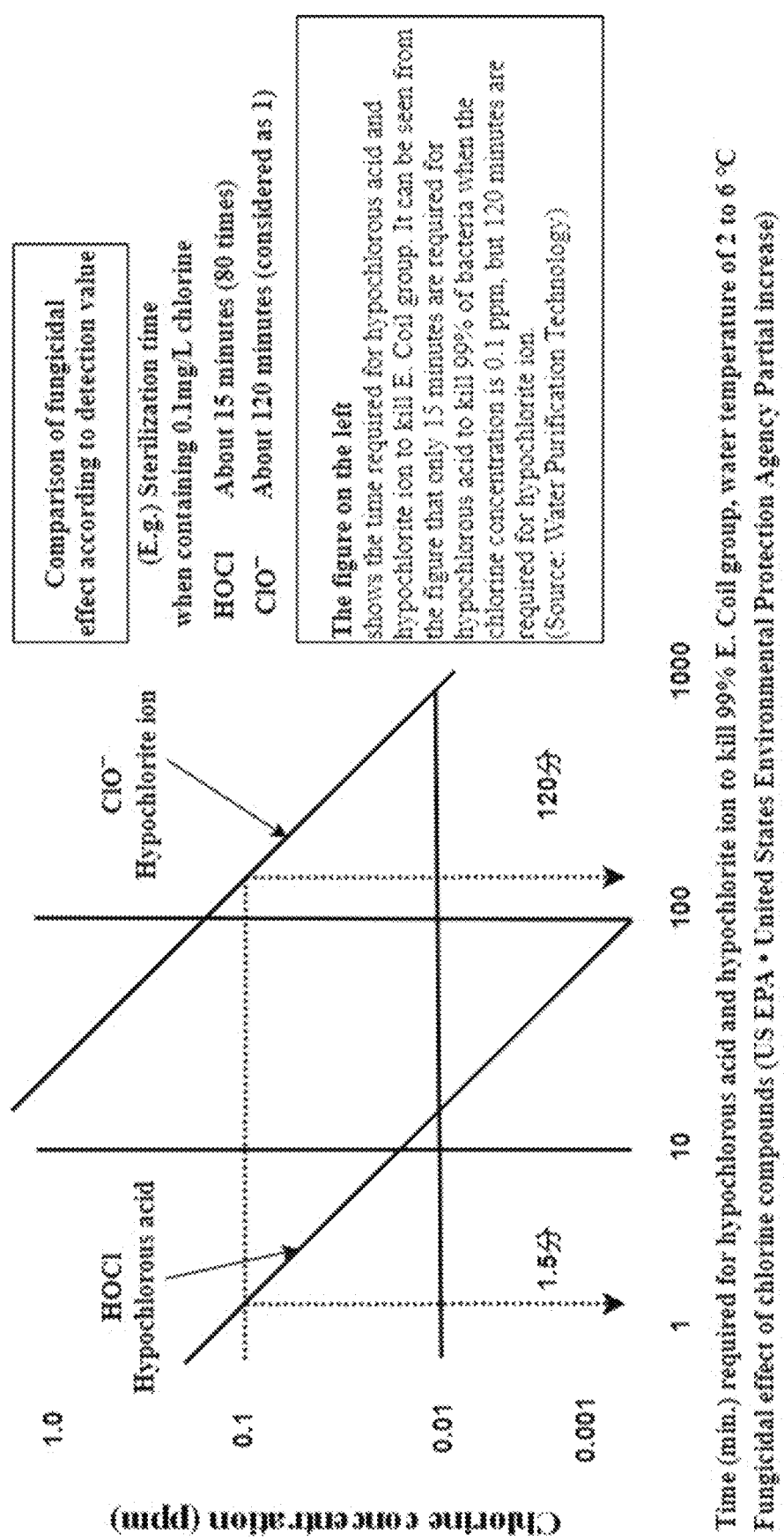
FIG. 2 shows the time required for hypochlorous acid and hypochlorous group ion to kill coliform. The bactericidal power of chlorine compounds (see U.S. EPA, partially added)

The following describes the specific embodiments of the present invention in detail in combination with specific situations:

Hypochlorous acid, CAS number 7790-92-3, is a transparent liquid at room temperature, it has different degrees of chlorous flavor depending on its concentration. Hypochlorous acid has a strong and fast sterilization effect, and reduce into water and salt at pH of 4.0 to 6.5 after sterilization. This technology of the invention is to use the chlorine powder (including sodium hypochlorite or calcium hypochlorite), which has hypochlorous acid (HOCl) and hypochlorous acid group ion (OCl) as main sterilized ingredient, to produce almost 100% of hypochlorous acid at pH of 4.0 to 6.5. The invention is developed based on the property of hypochlorous acid at pH of 4.0 to 6.5. Such hypochlorous acid has strong bactericidal effect, human safety, less effect on foods, less corrosiveness to equipment, and wide applicability and practicability. In recent years, the hypochlorous acid is widely used in Japan, Korea, Europe and American, and used in food processing industry, medical institutions, animal husbandry, food and cooking hygiene profession or public places for fully sterilization.

This application presents a novel disinfection product through the scientific configuration of its components, maximizing the superiority of its properties and other components.

Embodiment 1, an Example is Described as Below

The hypochlorous acid disinfectant of the invention is calculated by weight percentage, in a total of 100%, chlorine powder (chlorine compounds including sodium hypochlorite or calcium hypochlorite) of 1.75 g, adding sodium dihydrogen phosphate, or citric acid or ingredients or raw materials with acidic of 2 g as a main ingredient, a desiccant of 0.75 g, and excipient of 0.5 g. The production method thereof is to mix the chlorine powder with the desiccant, then add the sodium dihydrogen phosphate or the citric acid, or ingredients or raw materials with acidic pH in turn, and then add the excipient, and after stirring well for about 20 to 30 minutes, hypochlorous acid disinfectant in this application case will be made.

Embodiment 2, an Example is Described as Below

The hypochlorous acid tablet disinfectant of the present invention, with the same ingredients as the above, is prepared by weight in a total of 100%, a chlorine powder (chlorine compounds including sodium hypochlorite or calcium hypochlorite) of 1.75 g, adding sodium dihydrogen phosphate or citric acid, or ingredients or raw materials with acidic pH of 2 g as a main ingredient, and desiccant of 0.75 g, and adding sodium bicarbonate of 1.5 g and excipients of 0.8 g while stirring. After well stirring for about 20 to 30 minutes, the hypochlorous acid disinfectant of the present invention is made after being tableted by a tableting press. The tablets of the present invention may be increased or decreased in raw material and percentage according to the concentration of hypochlorous acid on demand, and the properties of slow or instant dissolution.

Figure 3:
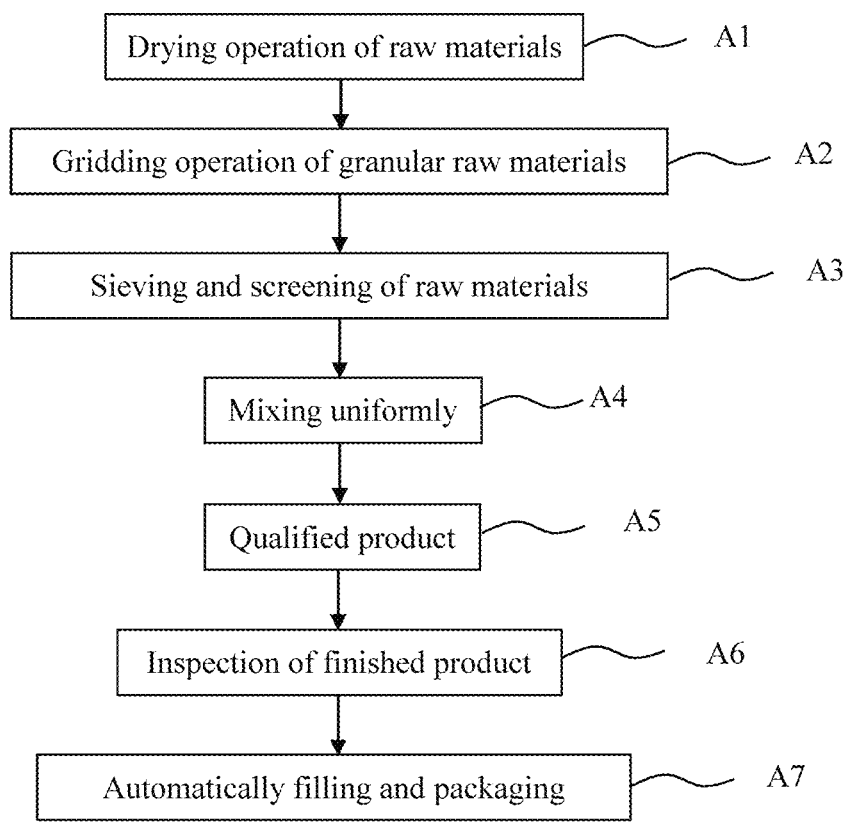
FIG. 3 shows a flow chart of a production method for the hypochlorous acid agent according to the present invention; and, FIG. 4 shows a flow chart of a production method for the hypochlorous acid disinfectant according to the present invention.
Figure 4:
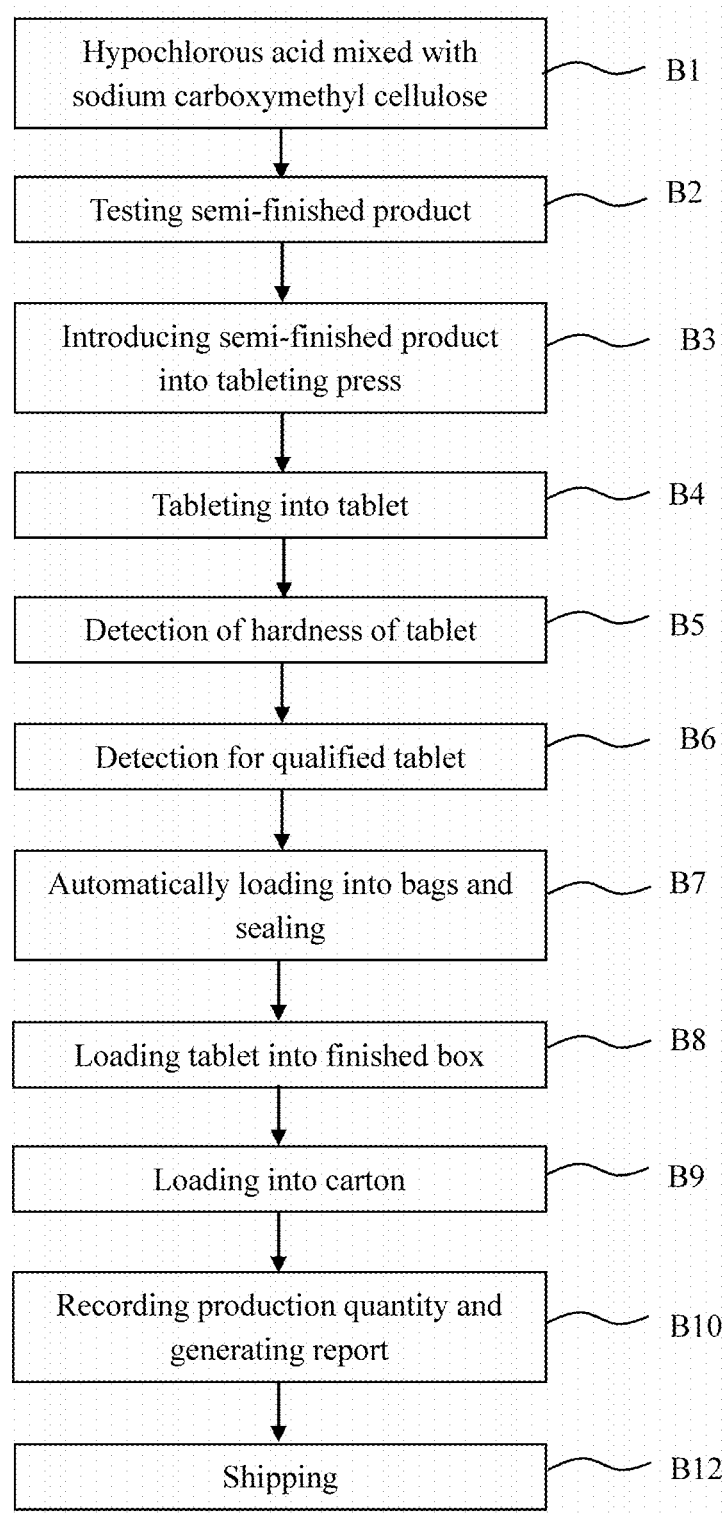

For detailed production methods, please refer to the flowcharts in FIGS. 3 and 4. First of all, the standards and requirements for the production process of the disclosure are as follows.

For the raw materials, each raw material supplier is requested to provide an analysis table of the raw material composition and a material safety data sheet to confirm that each raw material complies with laws and regulations.

The basic conditions and specifications of the production room include: (1) the raw materials must be dried at 40 to 50 degrees, or choose anhydrous raw materials; (2) The granular raw materials should be ground to ensure that the raw materials can be mixed uniformly; (3) the filling room should be kept at a temperature of 18 to 25 degrees and a relative humidity: 20% to 25% law humidity of production workshop; (4) the production line must meet the specifications of GMP, HACCP or related operations.

For packaging materials, the hypochlorous acid agent should be sealed in an opaque aluminum foil bag or a waterproof bag, moisture-proof bag; this hypochlorous acid tablet should be sealed in an opaque aluminum foil bag, and the hypochlorous acid tablet can be sealed into an inner box and an outer box with films.

For the quality control standards, a pH value and a concentration of the hypochlorous acid should be measured in each lot number of semi-finished products; the pH value of hypochlorous acid should be pH 4 to 6.5, and the concentration of the hypochlorous acid should be 200 ppm or above. When the quality does not meet the requirements, it shall be treated as waste.

It should be noted that related processes must conform to laws and regulations.

The production process includes incoming materials inspection and acceptance, storage, amounting production quantity, and confirmation of the demand/weight of each raw material.

For the production operation process of the hypochlorous acid agent of the present invention, the key items are as follows:

They include raw materials drying operation (step A1), granular raw materials grinding operation (step A2), raw materials sieving and screening (step A3), weighing and sequentially mixing by machine (step A4), finished product inspection of hypochlorous acid (step A5), a qualified product of the hypochlorous acid (step A6), filling and loading the qualified product of the hypochlorous acid into an aluminum foil bag or a moisture-proof bag (step A7). Please refer to the flow chart in FIG. 3.

With reference to FIG. 3, the production method of the hypochlorous acid agent of the present invention is illustrated as follows:

In step A1, the raw materials are first placed and dried at a temperature of 40 to 50° C. for 4 to 5 hours. After drying, the moisture is measured, and the moisture content of each raw material shall be 2% for conformity (i.e., the moisture ≤2%);

In step A2, the raw materials containing particles is ground to meet the requirements for fine powder, so that the ingredients can be fully mixed;

In step A3, the raw materials after drying are sieved with a 50-80 mesh screen. During the sieving, the temperature of the production room shall be controlled at 18° C.~25° C. and the relative humidity at 20%~25% to prevent impurities and particles in the raw materials, so that raw material powders of the compound ratio can be fully mixed to achieve uniform requirements.

In step A4, according to the composition requirements, weigh the chlorine powder, the desiccant, sodium dihydrogen phosphate or citric acid or ingredients or raw materials with acidic pH, and excipients in order, and then first put the chlorine powder and desiccant in a mixer for stirring, then add the sodium dihydrogen phosphate, or citric acid or ingredients or raw materials with acidic pH, and excipients, and after mixing well for 20 to 30 minutes, take out the finished product. Take sample from different mixing locations, and according to product standards of the company, determine whether the pH value of the finished product of the hypochlorous acid is 4 to 6.5 and whether the concentration of the hypochlorous acid reaches the product standard of 200 ppm.

In step A5, the finished product of the hypochlorous acid is tested, and if it is fails, it will be scrapped. Step A6 is to confirm the produced hypochlorous acid is acceptable. Step A7 is to fill the hypochlorous acid agent into an aluminum foil bag or a moisture-proof bag.

Before production, it should be noted that: 1. The moisture of all raw materials should not exceed 2%; 2. the temperature is 15-25° C., and the relative humidity is 20-25%; 3. The raw materials are added in order, the chlorine powder and the sodium dihydrogen phosphate, or citric acid or ingredients or raw materials with acidic pH must not be directly stirred, and the chlorine powder and the desiccant must be mixed first and then mixed with other components and stirred. The hypochlorous acid product of the present invention is produced, which is safe and efficient to use, and can be widely used as a disinfectant.

With reference to FIG. 4, the production method for the hypochlorous acid tablet of the present invention is as below:

Grind the acceptable hypochlorous acid agent (step A6) into a fine powder and mix it with the excipient (step B1) for testing the semi-finished product of the hypochlorous acid (step B2). Put the semi-finished product of the hypochlorous acid into the tableting press (step B3); make t hypochlorous acid tablets (step B4); conduct hypochlorous acid tablet hardness test (step B5), and the hypochlorous acid tablet conformity test (step B6). Fill the aluminum foil bag with the hypochlorous acid tablets and seal it by the machine (step B7); load the hypochlorous acid tablets into finished boxes (step B8); load the boxes of the hypochlorous acid tablets into cartons (step B9); sum up the daily production quantity of the hypochlorous acid tablets and prepare a production report (step B10); ship the hypochlorite tablets (step B111). Please refer to the flow chart in FIG. 4.

In the step B1, grind the acceptable hypochlorous acid agent into the fine powder, and mixed with the excipient to be well and uniform, and determine the moisture content. The moisture content must be 1% or less to be accepted (i.e., the moisture content ≤1%).

The acceptable semi-finished hypochlorous acid after being test in the step B2 is put into the tableting press in the step B3, to automatically conduct the tableting (i.e., step B4). During tableting, the moisture of the raw materials is ≤1%, the temperature is 15 to 25° C., and the humidity is 20 to 25%; in the step B5, the tablet is checked and weighed every 10 minutes to prevent the weight of the tablet from being incorrect. After confirming that the tablet is acceptable in the step B6, the hypochlorous acid tablets are packed into the aluminum foil bag and sealed in the step B7. The hypochlorous acid tablets are loaded into the finished box and marked with the lot number and expiration date in the step B8. In the step B9, the finished boxes of the hypochlorous acid tablets are loaded into the cartons and marked with the lot number. In the step B10, the field operator records the lot number of the finished product of the hypochlorous acid tablets daily. Finally, the shipping operation is performed according to the business unit order in the step B11.

In step B5, a hardness check is carried out; 10 pieces are sampled to confirm that the hardness meets the enterprise's quality and hardness standards is acceptable; if it is non-conforming, scrap the product.

In steps B7, B8 and B9, the acceptable semi-finished products are packed into the aluminum foil bag according to the requirements, and marked with the lot number with an automatic inkjet machine, and sealed with a film; every 5 bags are packed in a box, and put with a product manual, then marked with the lot number, production data and the expiration date, and sealed with a film; every 24 boxes are packed into a carton and marked with the lot number.

In step B10, before the finished products are packed into the warehouse, the quality control personnel will check the lot number, product specifications and other information of the packaged product one by one, and verify that they are correct before entering the warehouse.

Similarly, in step B6, samples for each batch of the finished product should be kept for future inspection; each batch of the finished product must be accompanied by a test report.

Before tableting, it should be noted that: 1. the moisture of all raw materials must not exceed 1%; 2. the temperature is 15-25° C., and the relative humidity is 20-25%.

The product of the present invention is produced and operated according to the present production process to produce the hypochlorous acid tablet product of the present invention, which is safe, efficient and widely used as a disinfectant.

The hypochlorous acid agent (powder) and hypochlorous acid tablet of the present invention has the functions of disinfection, sterilization, deodorization, water purification and bleaching, safe for people and animals, and can be widely used in swimming pool disinfection, drinking water disinfection, food processing industry, food and cooking hygiene profession, industrial water treatment, aquaculture, daily chemical industry, medical industry, schools, epidemic prevention, hotels, restaurants and large-scale sterilization after floods to prevent infection, and so on. With the economic development, the living standard is increasing day by day, and the demand for disinfection and sterilization of evolving bacteria and viruses are increasing. The development of the hypochlorous acid agent and hypochlorous acid tablet) will gradually replace chlorine-containing disinfectants, and it will be more widely used in daily sterilization needs, which will benefit national health and environmental well-being.

Where the foregoing is directed to the embodiments of the present invention, other or further embodiments of the present invention can be designed without violating its basic scope, and their basic scope is defined by the following claims. Although the present invention is explained in terms of related preferred embodiments, this does not constitute a limitation on the present invention. It should be noted that skilled persons in the field can construct many other similar embodiments based on the idea of the present invention, which are within the protection scope of the present invention.

What is claimed is:

1. A hypochlorous acid disinfectant consisting of:
   20 to 45 weight percent of sodium hypochlorite or calcium hypochlorite, 15 to 40 weight percent of sodium dihydrogen phosphate or inorganic acid, 15 to 20 weight percent of desiccant, and 3 to 10 weight percent of sodium carboxymethyl cellulose.

2. A production method of the hypochlorous acid disinfectant, wherein the disinfectant is prepared by, by weight in a total of 100%, sodium hypochlorite or calcium hypochlorite of 20 to 45%, adding sodium dihydrogen phosphate or inorganic acid of 15 to 40%, a desiccant of 15 to 20%, sodium bicarbonate of 5% to 10%, and sodium carboxymethyl cellulose of 5 to 10%;
   after mixing well, these can be made into a hypochlorous acid agent (powder) or hypochlorous acid tablets by tableting.

3. A production method of the hypochlorous acid disinfectant, wherein the disinfectant is prepared by weight in a total of 100%, a sodium hypochlorite or calcium hypochlorite of 20 to 45%, adding sodium dihydrogen phosphate, inorganic acid 15 to 40%, a desiccant of 15 to 20%, sodium carboxymethyl cellulose of 3 to 8%, and sodium bicarbonate of 5 to 10%;
   the raw materials are put into a bag A [chlorine powder, desiccant] and a bag B [sodium dihydrogen phosphate or inorganic acid], and when in use, then separately add the bag A and the bag B into water in order and mixed to generate hypochlorous acid solution.

4. A production method of the hypochlorous acid disinfectant, which are characterized in that the disinfectant is composed of the following components in weight percentage:
   sodium dihydrogen phosphate, or inorganic acid of 60 to 85% and sodium bicarbonate of 10 to 18% are prepared into a hypochlorous acid pH acidity regulator (powder);
   when in use, the hypochlorous acid pH acidity regulator is added into a measured sodium hypochlorite solution or calcium hypochlorite solution to generate the hypochlorous acid liquid.

5. A production method of the hypochlorous acid disinfectant, which is characterized by the following production methods:
   step A1:
   the raw materials are first placed and dried at a temperature of 40 to 50° C. for 4 to 5 hours, after that, drying the moisture is measured, and the moisture content of each raw material shall be 2% for conformity (i.e., the moisture content <2%);
   step A2:
   the raw materials containing particles is ground to meet the requirements for fine powder, so that the ingredients can be fully mixed;
   step A3:
   the raw materials after drying are sieved with a 50~80 mesh screen, and during the sieving the temperature of the production room shall be controlled at 18° C.~25° C. and the relative humidity at 20%~25% to prevent impurities and particles in the raw materials, so that raw material powders of the compound ratio can be fully mixed to achieve uniform requirements;

step A4:

according to the composition requirements, weigh the sodium hypochlorite or calcium hypochlorite, a desiccant, sodium dihydrogen phosphate, or inorganic acid, and sodium carboxymethyl cellulose in order, and then firstly put the chlorine powder and the desiccant in a mixer for stirring, then add the sodium dihydrogen phosphate or inorganic acid and sodium carboxymethyl cellulose, and after mixing well for 20 to 30 minutes, take out the finished product and taking samples from different mixing locations, and according to product standards of the company, determine the pH value of the finished product of the hypochlorous acid as 4 to 7.0 and the concentration of the hypochlorous acid must reach the product standard of 200 ppm or higher;

step A5:

the finished product of the hypochlorous acid is tested, and if it is fails, it will be scrapped;

step A6:

confirm that the produced hypochlorous acid is acceptable; and step A7:

fill the hypochlorous acid agent into an aluminum foil bag or a moisture-proof bag.

6. The production method of the hypochlorous acid disinfectant according to claim 5, wherein in the step A1, the moisture of all raw materials should not exceed 2%, the temperature is 15°~25° C., and the relative humidity is 20~25%;

the raw materials should be added in order, and the chlorine powder and the sodium dihydrogen phosphate or inorganic acid cannot be directly stirred, and the chlorine powder and the desiccant must be mixed first and then mixed with other components and stirred.

7. The production method of the hypochlorous acid disinfectant according to claim 5, wherein the production method of the disinfectant comprises:

step B1:

grind the acceptable hypochlorous acid in the step A6 into a fine powder and mixing with the sodium carboxymethyl cellulose;

step B2:

test a semi-finished product of the hypochlorous acid;

step B3:

put the semi-finished product of the hypochlorous acid into the a tableting press;

step B4:

make hypochlorous acid tablets with the tableting press;

step B5:

conduct the hypochlorous acid tablet hardness test;

step B6:

conduct the hypochlorous acid tablet conformity test;

step B7:

fill the aluminum foil bag with the hypochlorous acid tablets and seal it by the machine;

step B8:

load the hypochlorous acid tablets into finished boxes;

step B9:

load the boxes of the hypochlorous acid tablet into cartons;

step B10:

sum up the daily production quantity of the hypochlorous acid tablets and prepare a production report;

step B11:

ship the hypochlorite tablets, wherein in the step B1, grind the acceptable hypochlorous acid agent into the fine powder, and mixed with the sodium carboxymethyl cellulose to be well and uniform, and determine the moisture content, wherein the moisture content must be 1% or less to be accepted (i.e., the moisture content <1%);

the acceptable semi-finished product of the hypochlorous acid after being test in the step B2 is put into the tableting press in the step B3, to automatically conduct the tableting in the step B4, wherein during tableting, the moisture of the raw materials <1%, the temperature is 15 to 25° C., and the humidity is 20 to 25%;

in the step B5, the tablet is checked and weighed every 10 minutes to prevent the weight of the tablet from being incorrect;

after confirming that the tablet is acceptable in the step B6, the hypochlorous acid tablets are packed in the aluminum foil bag and sealed in the step B7;

the hypochlorous acid tablets are loaded into the finished box and marked with the lot number and an expiration date in the step B8; in the step B9, the finished boxes of the hypochlorous acid tablets are loaded into cartons and marked with the lot number;

in the step B10, the field operators record the lot number of the finished product of the hypochlorous acid tablets daily; and finally, the shipping operation is performed according to the business unit order in the step B11.

8. The production method of the hypochlorous acid disinfectant according to claim 7, wherein in the step B5, a hardness check is carried out;

10 pieces are sampled to confirm that the hardness meets the enterprise's quality and hardness standards is acceptable;

if it is non-conforming, scrap the product;

in the step B6, samples for each lot of the finished product should be kept for future inspection; and each batch of the finished product must be accompanied by a test report.

* * * * *